(12) United States Patent
Inoue (10) Patent No.: US 10,710,674 B2
(45) Date of Patent: Jul. 14, 2020

(54) BICYCLE PEDAL

(75) Inventor: Akira Inoue, Osaka (JP)

(73) Assignee: Shimano Inc., Osaka (JP)

( * ) Notice: Subject to any disclaimer, the term of this patent is extended or adjusted under 35 U.S.C. 154(b) by 1380 days.

(21) Appl. No.: 13/416,114

(22) Filed: Mar. 9, 2012

(65) Prior Publication Data

US 2013/0025404 A1    Jan. 31, 2013

(30) Foreign Application Priority Data

Jul. 29, 2011    (JP) .................................. 2011-166846

(51) Int. Cl.
B62M 3/08    (2006.01)

(52) U.S. Cl.
CPC ............ B62M 3/086 (2013.01); *Y10T 74/217* (2015.01)

(58) Field of Classification Search
CPC .... Y10T 74/2168; Y10T 74/217; B62M 3/08; B62M 3/083; B62M 3/086
USPC .................................. 74/594.1, 594.4, 594.6
See application file for complete search history.

(56) References Cited

U.S. PATENT DOCUMENTS

| | | | |
|---|---|---|---|
| 5,423,233 A * | 6/1995 | Peyre et al. ................. | 74/594.6 |
| 6,425,304 B1 | 7/2002 | Bryne | |
| 6,446,529 B1 | 9/2002 | Tanak | |
| 8,857,292 B2 * | 10/2014 | Bryne ......................... | 74/594.6 |

FOREIGN PATENT DOCUMENTS

EP    1 219 532 A2    3/2002

* cited by examiner

*Primary Examiner* — Richard W Ridley
*Assistant Examiner* — Brian J McGovern
(74) *Attorney, Agent, or Firm* — Global IP Counselors, LLP (57) ABSTRACT

A bicycle pedal comprises a pedal axle, a main pedal body, a coupling mechanism and a cleat movement restricting member. The main pedal body is rotatably supported on the pedal axle. The coupling mechanism includes a first cleat securing member and a second cleat securing member. The first cleat securing member is configured to be coupled to a front portion of a cleat. The second cleat securing member is configured to be coupled a rear portion of the cleat. The cleat movement restricting member is configured to restrict movement of the cleat in at least one direction between a frontward direction and a rearward direction. The cleat movement restricting member is further configured and arranged relative to the coupling mechanism such that the cleat movement restricting member guides the cleat during a cleat disengagement operation in which the cleat detaches from the coupling mechanism.

15 Claims, 10 Drawing Sheets

BICYCLE PEDAL

CROSS-REFERENCE TO RELATED APPLICATIONS

This application claims priority under 35 U.S.C. § 119 to Japanese Patent Application No. 2011-166846, filed Jul. 29, 2011. The entire disclosure of Japanese Patent Application No. 2011-166846 is hereby incorporated herein by reference.

BACKGROUND

Field of the Invention

This invention generally relates to a bicycle pedal. More specifically, the present invention relates to a bicycle pedal that is releasably attached to a cleat of a cycling shoe.

Background Information

A conventional clipless pedal that can connect to a cleat attached to a shoe is a known example of a bicycle pedal that can connect to a cycling shoe (e.g., European Patent Application Publication No. 1,219,532). When a clipless type bicycle pedal is used, the crank can be rotated during an upstroke as well by pulling upward. As a result, the crank can be rotated more efficiently.

A conventional clipless bicycle pedal comprises a pedal axle that can be attached to a crank of a bicycle, a main pedal body turnably supported on the pedal axle, and a coupling mechanism. The coupling mechanism is fixed to two opposite faces of the pedal main pedal body and has a first cleat securing member configured to couple with a front portion of a cleat and a second cleat securing member configured to couple with a rear portion of the cleat. The first cleat securing member is non-turnably fixed to the main pedal body and the second cleat securing member is turnably coupled to the main pedal body. The second cleat securing member is forced in a direction of coupling with a cleat by a torsion coil spring or other force exerting member.

With such a conventional bicycle pedal, a cleat disengagement operation is executed by pushing the heel of the shoe outward while the shoe is coupled to the pedal. When the heel of the shoe is pushed outward, the second cleat securing member is rotated in a disengagement direction against the exerted force of the force exerting member. As a result, a front end of the cleat separates from the first cleat securing member and the shoe can be removed from the pedal.

SUMMARY

A conventional bicycle pedal uses a force exerting member that exerts a force sufficient to prevent the shoe from detaching from the pedal during pedaling. However, it takes some time for an inexperienced rider to get accustomed to attaching and detaching a cycling shoe to and from a conventional bicycle pedal equipped with a force exerting member that exerts a strong force.

One object presented in this disclosure is to provide a bicycle pedal that enables even an inexperienced rider to attach and detach a shoe to and from a bicycle pedal with ease by making it difficult for the shoe to detach from the pedal even if a weak force is exerted by a force exerting member.

In view of the state of the known technology, a bicycle pedal according to a first aspect comprises a pedal axle, a main pedal body, a coupling mechanism and a cleat movement restricting member. The main pedal body is rotatably supported on the pedal axle. The coupling mechanism includes a first cleat securing member and a second cleat securing member. The first cleat securing member is configured to be coupled to a front portion of a cleat. The second cleat securing member is configured to be coupled a rear portion of the cleat. The cleat movement restricting member is configured to restrict movement of the cleat in at least one direction between a frontward direction and a rearward direction. The cleat movement restricting member is further configured and arranged relative to the coupling mechanism such that the cleat movement restricting member guides the cleat during a cleat disengagement operation in which the cleat detaches from the coupling mechanism.

With this bicycle pedal, a cleat disengagement operation, i.e., removing a shoe from the pedal, is accomplished by, for example, twisting a heel of the shoe outward. When this is done, the movement restricting member guides the cleat such that the cleat detaches from the coupling mechanism. When the pedal is pedaled, the cleat movement restricting member restricts movement of the cleat in at least one direction between a frontward direction and a rearward direction. Thus, either the first cleat securing member or the second cleat securing member is configured to turn and the shoe does not easily detach even if a force exerted against the turnable cleat securing member by the force exerting member is weak.

With the bicycle pedal disclosed herein, when the pedal is pedaled, the cleat movement restricting member restricts movement of the cleat in at least one direction between a frontward direction and a rearward direction. Consequently, either the first cleat securing member or the second cleat securing member is configured to rotate and the shoe does not easily detach from the pedal even if a force exerted by a force exerting member serving to exert a force against the rotating cleat securing member is weak. Therefore, it is possible to provide a bicycle pedal that enables even an inexperienced rider to attach and detach a shoe to and from the bicycle pedal with ease.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
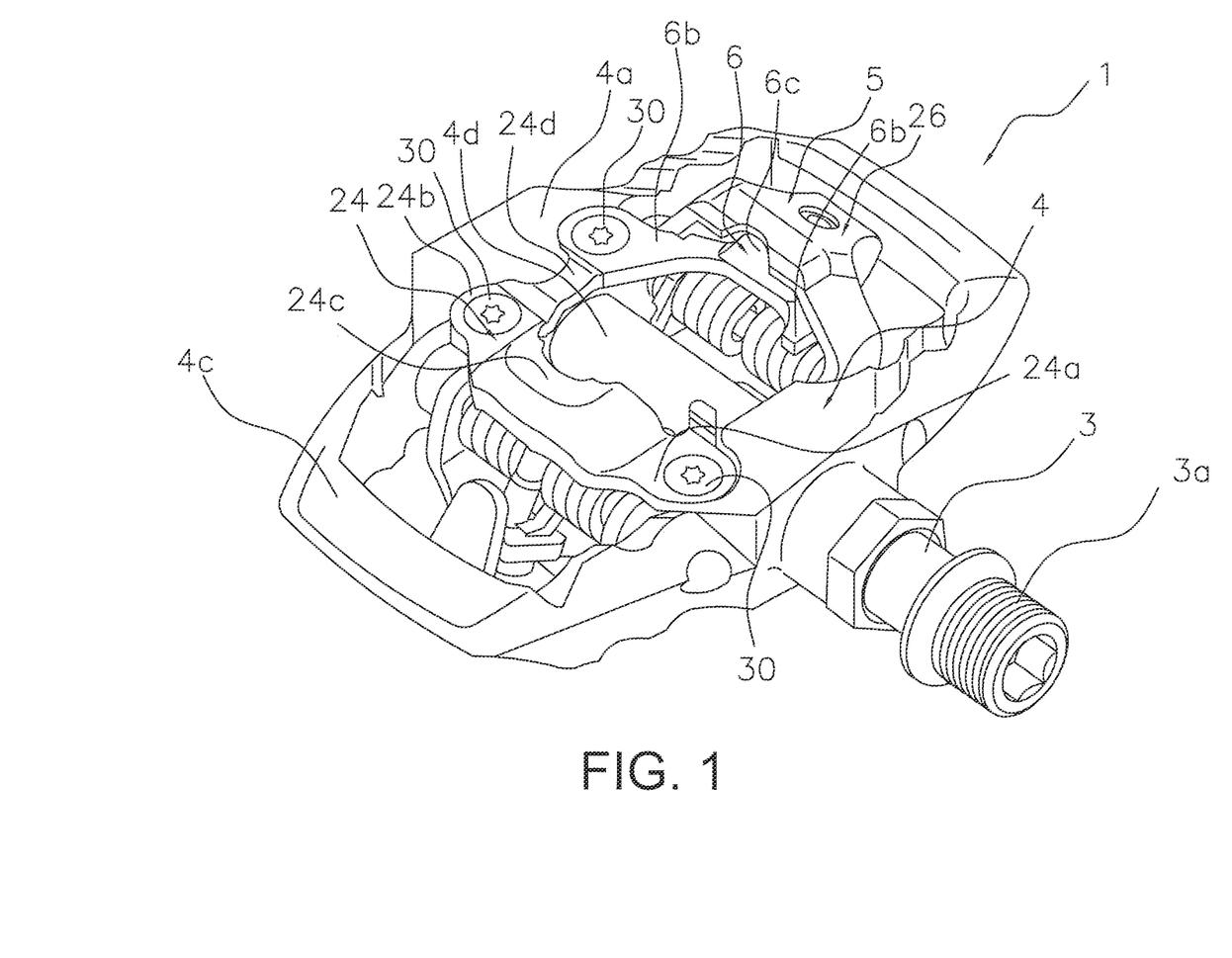
FIG. 1 is a perspective view of a bicycle pedal in accordance with a first embodiment.
Figure 2:
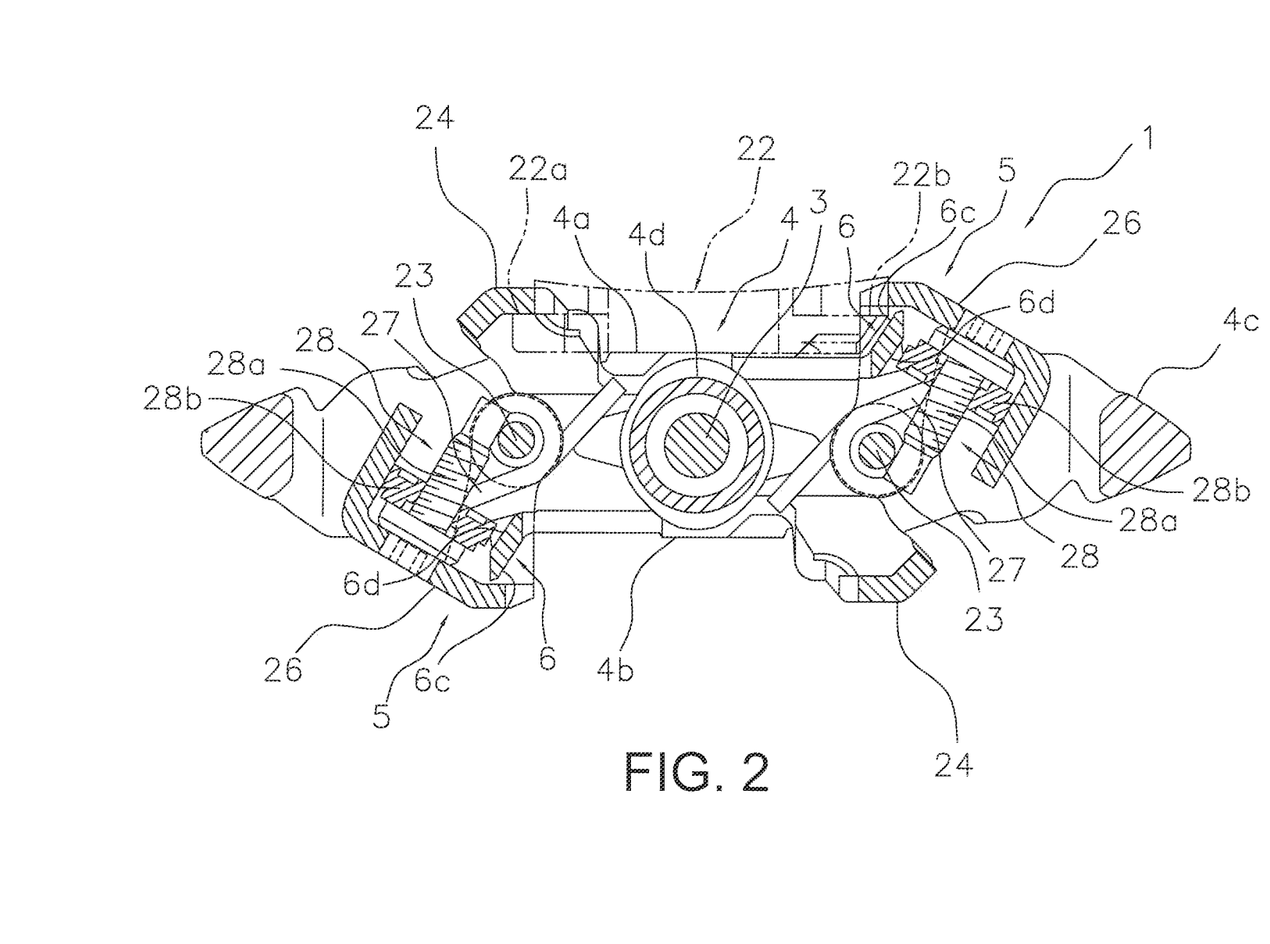
FIG. 2 is a longitudinal cross sectional view of the bicycle pedal illustrated in FIG. 1.

Referring initially to FIGS. 1 and 2, a bicycle pedal 1 is illustrated in accordance with a first embodiment. FIG. 1 is a perspective view of the bicycle pedal 1, while FIG. 2 is a longitudinal cross sectional view of the bicycle pedal 1. Hereinafter, the bicycle pedal 1 will simply be called "pedal 1" for the sake of brevity. As shown in FIGS. 1 and 2, the bicycle pedal 1 (hereinafter called "pedal 1") includes a pedal axle 3, a main pedal body 4, a pair of coupling mechanisms 5 and a cleat movement restricting member 6. The pedal axle 3 is configured to be fastened to a crank (not shown) of the bicycle. The main pedal body 4 is rotatably supported on the pedal axle 3. The coupling mechanisms 5 releasably secure a cleat 22, which is attached to a shoe, to the main pedal body 4. Thus, the pedal 1 is a clipless or step-in pedal. The cleat movement restricting member 6 is configured to restrict a movement of the cleat 22 in a rearward direction.

One end of the pedal axle 3 has an externally threaded section 3a that is configured to be screwed into a crank. The other end of the pedal axle 3 serves to rotatably support the main pedal body 4 with a bearing arrangement (not shown).

The main pedal body 4 has a first face 4a and a second face 4b. The main pedal body 4 has a stepping platform 4c that is arranged to surround the coupling mechanisms 5. The main pedal body 4 has a cylindrical section 4d having a bearing arrangement (not shown) arranged inside. Two support shafts 23 are arranged in the main pedal body 4 on opposite sides of the pedal axle 3 for supporting the coupling mechanisms 5. The first coupling shaft 23 is arranged on the right side in FIG. 2, and is arranged for supporting the first coupling mechanism 5 arranged on the first face 4a. The second coupling shaft 23 arranged on the left side in FIG. 2, and is arranged for supporting the second coupling mechanism 5 arranged on the second face 4b.

It is preferable for the coupling mechanisms 5 to be provided on each of the first face 4a and the second face 4b of the main pedal body 4 as shown in FIGS. 1 and 2. The two coupling mechanisms 5 are arranged symmetrically 180 degrees out of phase with respect to each other in a rotational direction. Each of the coupling mechanisms 5 has a first cleat securing member 24 and a second cleat securing member 26.

Figure 4:
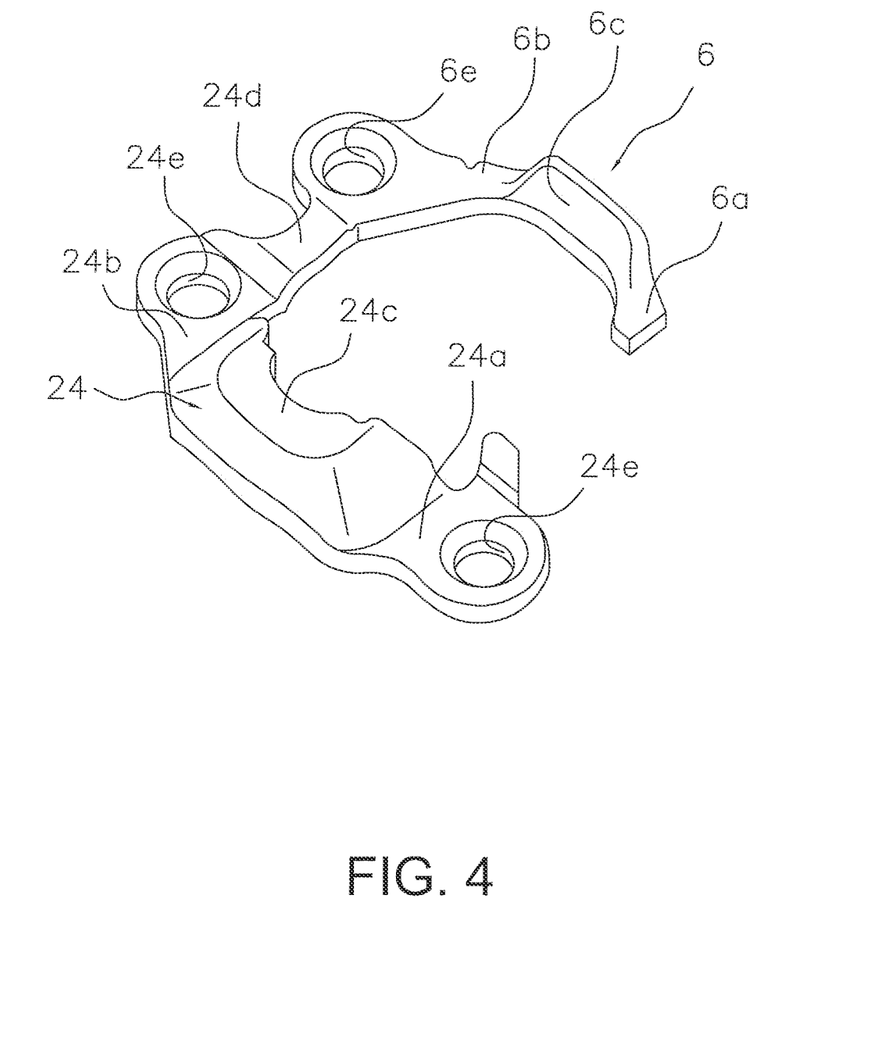
FIG. 4 is a perspective view of a cleat movement restricting member for use with the bicycle pedal illustrated in FIGS. 1 and 2.
Figure 5:
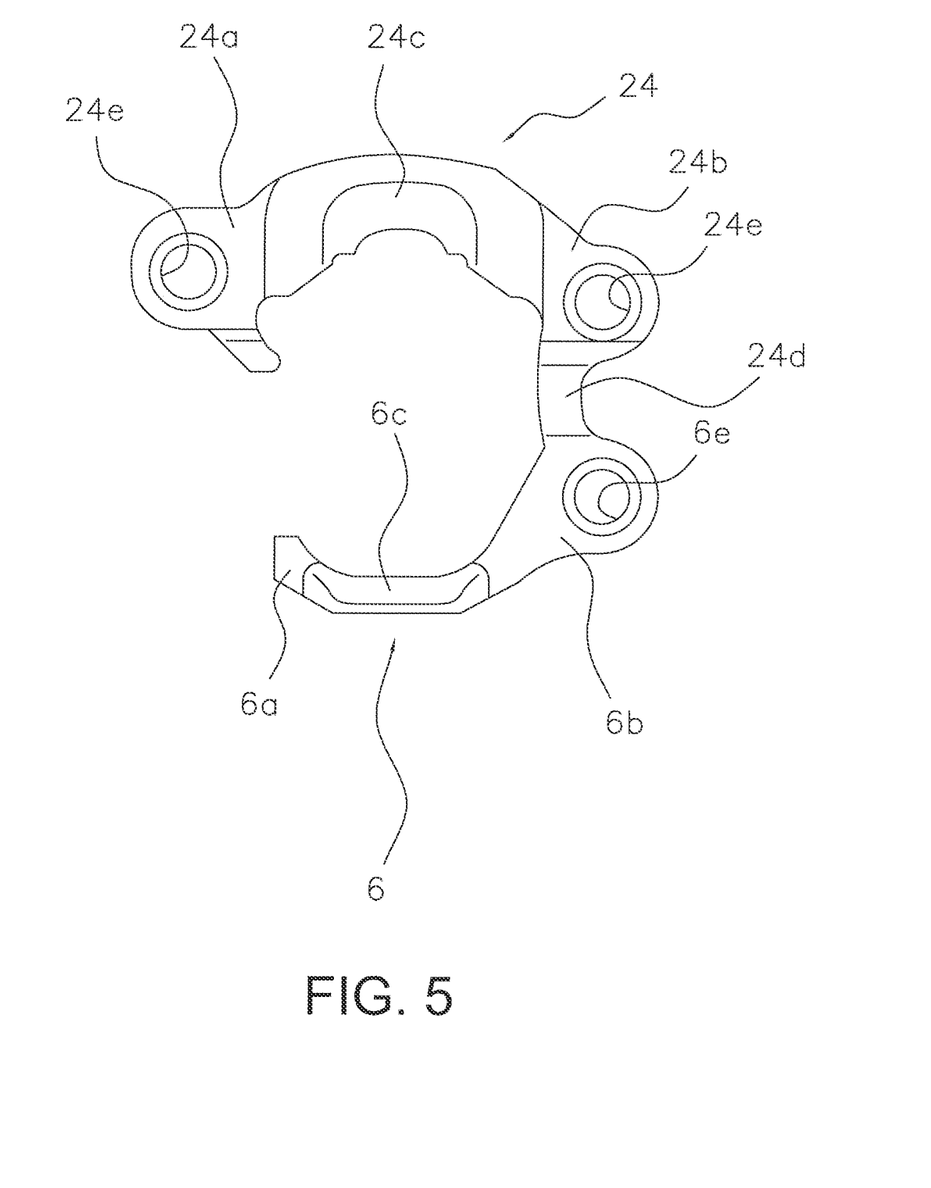
FIG. 5 is a top plan view of the cleat movement restricting member illustrated in FIG. 4 for use with the bicycle pedal illustrated in FIGS. 1 and 2.

Each of the first cleat securing members 24 is rigidly fixed to one of the first and second faces 4a and 4b in a non-movable manner for coupling with a front portion 22a of the cleat 22. As shown in FIGS. 1, 4 and 5, each of the first cleat securing members 24 has a first securing end portion 24a that is arranged adjacent a base end of the pedal axel 3 and a second securing end portion 24b that is arranged adjacent a tip end of the pedal axle 3. The first securing end portion 24a and the second securing end portion 24b are each provided with a screw insertion hole 24e for inserting a flat head screw 30 serving to fasten the first cleat securing member 24 to the main pedal body 4. Each of the first cleat securing members 24 has a cleat catching section 24c that is arranged between the first end section 24a and the second securing end portion 24b, bulges upward in an arch-like shape, and can catch onto the front portion 22a of a cleat. An intermediate section 24d for joining integrally with the cleat movement restricting member 6 is provided on the second end of the first cleat securing section 24.

Figure 3:
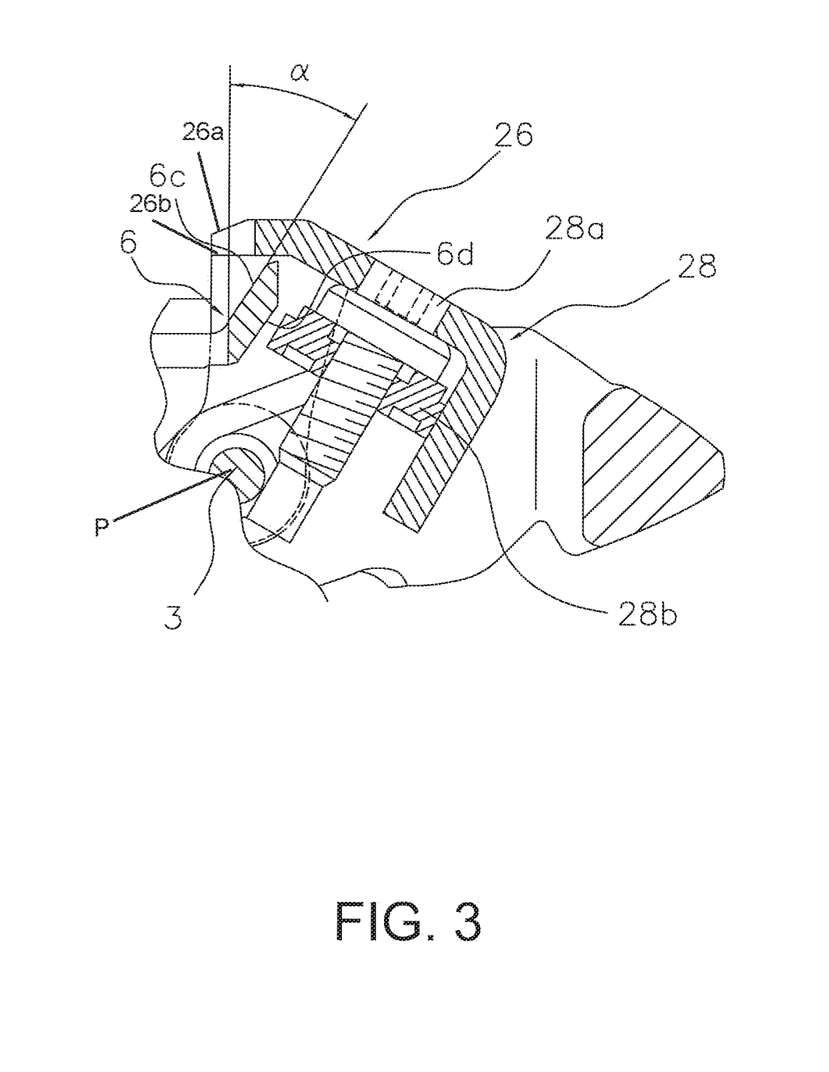
FIG. 3 is an enlarged cross sectional view of a portion of the bicycle pedal illustrated in FIG. 2 in a vicinity of the second cleat securing member.

As shown in FIGS. 1, 2 and 3, each of the second cleat securing members 26 is pivotally attached to the main pedal body 4. The second cleat securing members 26 can couple with a rear portion 22b of a cleat 22. Along a longitudinal direction of the bicycle, the second cleat securing member 26 is arranged rearward of the first cleat securing member 24 so as to face toward the first cleat securing member 24. Each of the second cleat securing members 26 is curved to generally have an upside down U-like shape. Both ends of each of the second cleat securing members 26 are supported pivotally on the respective coupling shaft 23. A force exerting member 27 is provided on an outside circumference of each of the coupling shafts 23 and serves to exert a force against the second cleat securing member 26 in a direction of securing a cleat 22, i.e., in a counterclockwise direction from the perspective of FIG. 2. In other words the force exerting member 27 is configured to bias the second cleat securing member 27 in the cleat securing direction to contact the rear portion 22b of the cleat 22. As shown in FIG. 2, the force exerting member 27 is operatively dispose between the main pedal body 4 and the second cleat securing member 27. A turning range of each of the second cleat securing members 26 is restricted such that the second cleat securing members turn within a prescribed range about the coupling shafts 23. The force exerting members 27 are, for example, torsion coil springs. An adjusting mechanism 28 for adjusting a force exerted by the force exerting member 27 is provided on each of the second cleat securing members 26, Each of the adjusting mechanisms 28 has an adjusting screw 28a pivotally, supported in the second cleat securing member and a nut member 28b meshed with the adjusting screw 28a. One end of the force exerting member 27 stopped on the nut member 28b and the other end is stopped on the main pedal body 4. When the adjusting screw 28a is turned, the nut member 28b moves up and down and the force exerted by the force exerting member 27 can be adjusted. As a result, the force required to turn the second cleat securing member 26 in order to remove a cleat 22 from the pedal 1 can be adjusted.

In this embodiment, the cleat movement restricting member 6 is arranged in a position to restrict a rearward movement of the cleat 22. As a result, even if the force exerted by the force exerting member 27 is adjusted to a weak force such that the second cleat securing member 26 can be turned with a weak force, the shoe will not easily become detached from the pedal 1 when the pedal 1 is pedaled because rearward movement of the cleat 22 is restricted. The cleat movement restricting member 6 guides the cleat 22 during a disengagement operation in which the shoe is removed from the pedal 1 such that the cleat 22 detaches from the coupling mechanism 5. Along a longitudinal direction of the bicycle, the second movement restricting member 6 is arranged rearward of the first cleat securing member 24 so as to face toward the first cleat securing member 24. Since the first cleat securing member 24 and the cleat movement restricting member 6 are arranged frontward and rearward of each other and facing each other, the cleat movement restricting member 6 serves in an effective manner to make it difficult for the cleat 22 to detach from the coupling mechanism 5. It is preferable for the cleat movement restricting member 6 to be arranged rearward of the pedal axle 3. It is also preferable for the cleat movement restricting member 6 to be arranged below the second cleat securing member 26. The second cleat securing member 26 is rotatably attached to the main pedal body 4 about a pivot axis P. Specifically, the cleat restricting member 6 is arranged underneath an end 26a of the second cleat securing member 26 as viewed from an axial direction parallel to the pivot axis P. The end 26a includes a cleat contacting surface 26b that is configured to contact the cleat 22 while the cleat 22 is engaged with the second cleat securing member 26. In this embodiment, the cleat movement restricting member 6 is joined integrally to the first cleat securing member 24 through the intermediate section 24d. As a result, the cleat movement restricting member 6 can be fastened to the main pedal body 4 simultaneously with the first cleat securing member 24 and the pedal 1 can be assembled more efficiently.

As shown in FIGS. 1, 4 and 5, the cleat movement restricting member 6 has a first restricting end portion 6a that is positioned adjacent the base end of the pedal axle 3 and a second restricting end portion 6b that is positioned adjacent a tip end of the pedal axle 3. The second restricting end portion 6b has a screw insertion hole for inserting one flat head screw 30. The intermediate section 24d extends so as to join the second securing end portion 24b of the first cleat securing member 24 and the second restricting end portion 6b of the cleat movement restricting member 6 together. Thus, the end portions of the first cleat securing member 24 and the cleat movement restricting member 6 that are located toward the tip end of the pedal 1 are joined together by the intermediate section 24d. As a result, even though the first cleat securing member 24 and the cleat movement restricting member 6 are formed as a one-piece integral unit, a large space can be formed below the sole of the shoe, i.e., in a center region of the pedal 1. As a result, mud and debris adhered to the shoe can fall readily from the space and it is more difficult for debris to become stuck in the pedal 1.

As shown in FIG. 3, the cleat movement restricting member 6 has a first slanted face 6c configured to guide a cleat 22 such that the cleat 22 detaches from the coupling mechanism 5 and a second slanted face 6d that is positioned on an opposite side as the first slanted face 6c and slanted in the same direction as the first slanted face 6c. The first slanted face 6c is configured such that two opposite edges are curved slightly frontward. The first slanted face 6c has a slant angle α of, for example, 30 to 40 degrees. The first slanted face 6c is arranged in such a position that the cleat 22 can move rearward approximately one millimeter. When the heel of a shoe is turned outward, the rear portion 22b of the cleat 22 can be guided upward by the first slanted face 6c. Consequently, by merely turning the heel of the shoe outward, the rear portion 22b of the cleat 22 is guided upward and pushes against the second cleat securing member 26. As a result, the second cleat securing member 26 turns clockwise from the perspective of FIG. 2 and the shoe can be removed from the pedal 1. Also, since the second slanted face 6d is slanted in the same direction as the first slanted face 6c, a large space can be formed rearward of the second slanted face 6d such that such members as the force exerting member 27 and the adjusting mechanism 28 can be arranged more easily.

Operation of the pedal 1 during upstroke pedaling and during removal of a shoe from the pedal 1 will now be explained with reference to FIGS. 6 and 7.

Figure 6:
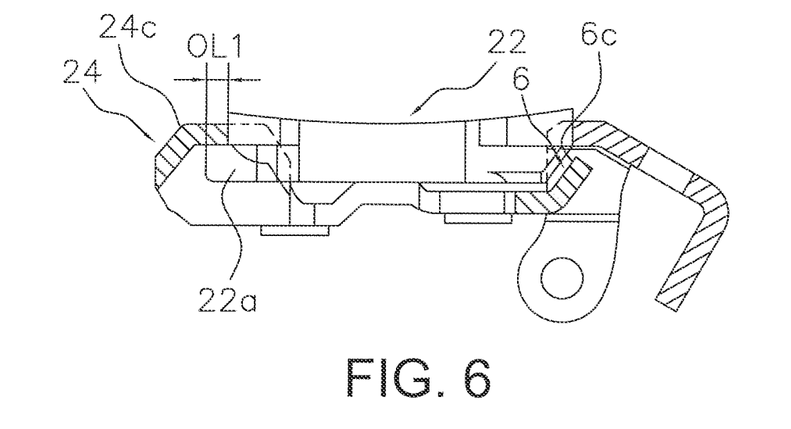
FIG. 6 is a cross sectional view of the cleat movement restricting member, one of the cleat securing members and one of the coupling mechanisms showing a cleat at a front end during an upstroke.
Figure 7:
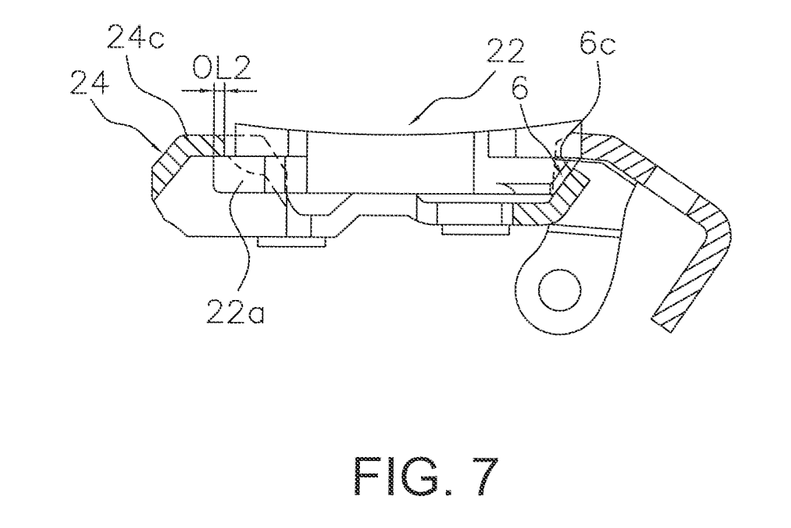
FIG. 7 is a cross sectional view of the cleat movement restricting member, one of the cleat securing members and one of the coupling mechanisms showing the cleat in a state of having moved to a rearward end during an upstroke.

When the cleat 22 is contacting the first cleat securing member 24 as shown in FIG. 6, an overlap amount OL1 between the cleat catching section 24c and the front portion 22a of the cleat 22 is approximately 2 mm. Conversely, when the rider pulls his or her foot rearward, the cleat 22 sometimes moves rearward. When this occurs, a diagonal end face 22c of the rear portion 22b of the cleat contacts the first slanted face 6c of the cleat movement restricting member 6 as shown in FIG. 7 and an overlap amount OL2 between the cleat catching section 24c of the first cleat securing member 24 and the front portion 22a of the cleat 22 becomes approximately one millimeter.

If the cleat 22 moves rearward during an upstroke, then the diagonal end face 22c of the rear portion 22b of the cleat 22 will contact the first slanted face 6c and the rearward movement will be prohibited. In such a case, the distance that the cleat 22 can move will be approximately one millimeter as mentioned previously. Thus, an overlap amount OL2 of, for example, approximately one millimeter is secured between the cleat catching section 24c of the first cleat securing member 24 and the front portion 22a of the cleat 22. As a result, even if the force exerted by the force exerting member 27 against the second cleat securing member 26 during upstroke pedaling is adjusted to a weaker force using the adjusting mechanism 28, the cleat 22 will not easily detach from the pedal 1.

Figure 8:
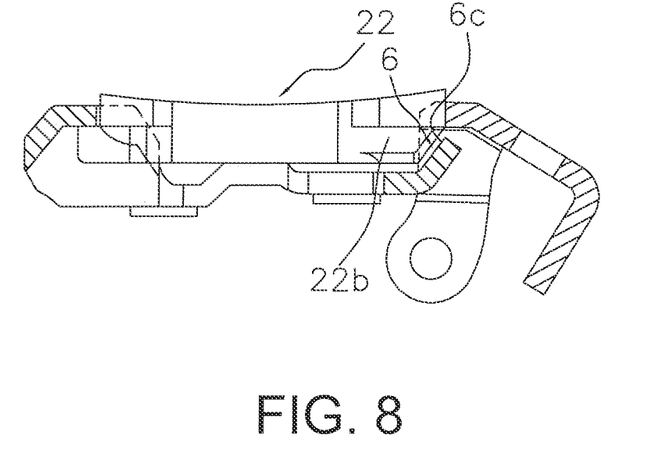
FIG. 8 is a cross sectional view of the cleat movement restricting member, one of the cleat securing members and one of the coupling mechanisms showing a situation in which the cleat is being detached from the pedal.
Figure 9:
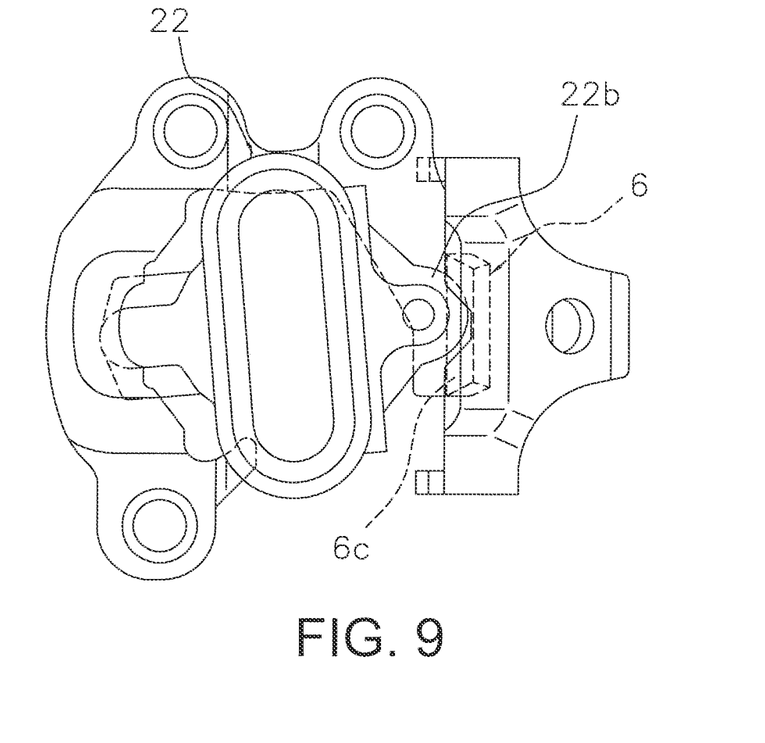
FIG. 9 is a top plan view of the cleat movement restricting member, one of the cleat securing members and one of the coupling mechanisms showing a situation in which the cleat is being detached from the pedal.
Figure 10:
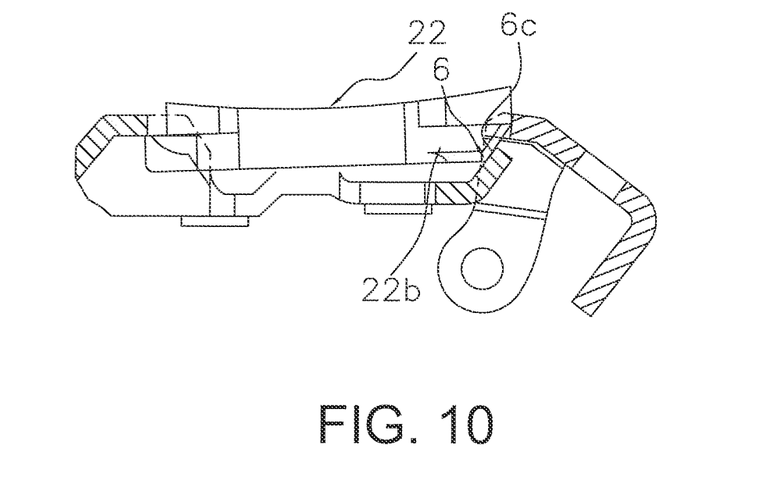
FIG. 10 is a cross sectional view of the cleat movement restricting member, one of the cleat securing members and one of the coupling mechanisms showing a situation in which the cleat is being detached from the pedal.
Figure 11:
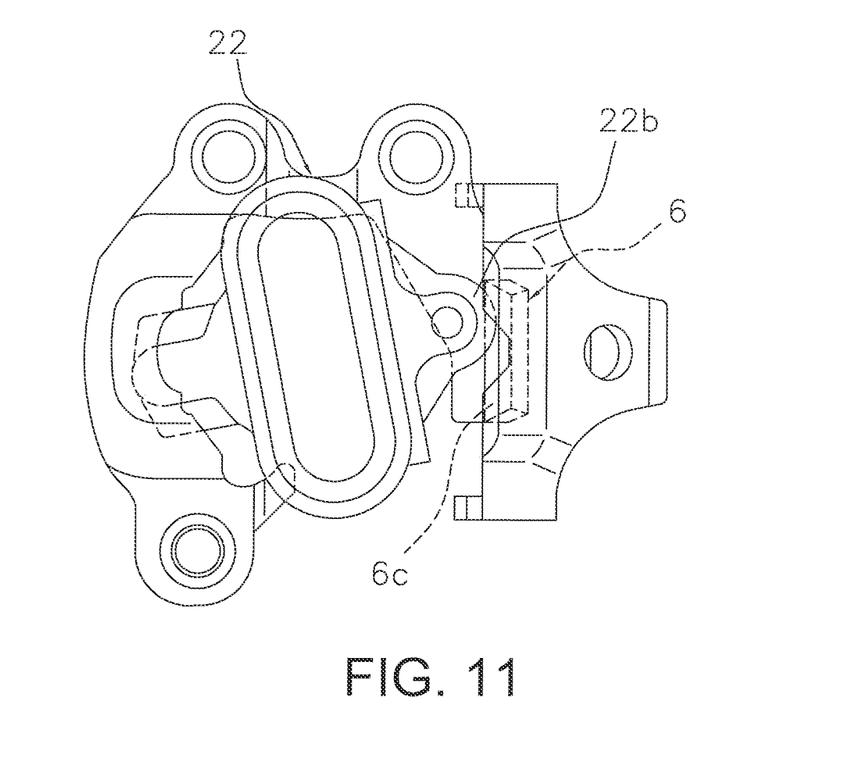
FIG. 11 is a cross sectional view of the cleat movement restricting member, one of the cleat securing members and one of the coupling mechanisms showing a situation in which the cleat is being detached from the pedal.

Meanwhile, when the shoe is to be removed from the pedal 1, the heel of the shoe is twisted outward. When this is done, as shown in FIGS. 8 and 9, the rear portion 22b of the cleat 22 does not contact the first slanted face 6c of the cleat movement restricting member 6 while the amount of twisting is within 8 degrees. When the twisting exceeds 9 degrees, the rear portion 22b of the cleat 22 contacts the first slanted face 6c of the cleat movement restricting member 6 and the first slanted face 6c guides rear portion 22b of the cleat 22 upward. Thus, the first slanted face 6c causes the rear portion 22b of the cleat 22 to be lifted more and more upward as the heel of the shoe is twisted farther outward. As a result, it is possible to provide a bicycle pedal 1 with which a cleat 22 of a shoe will not easily detach from the coupling mechanism 5 even if the exerted force of the force exerting member 27 is weakened such that an inexperienced rider can easily remove the shoe from the pedal 1.

While only selected embodiments have been chosen to illustrate the present invention, it will be apparent to those skilled in the art from this disclosure that various changes and modifications can be made herein without departing from the scope of the invention as defined in the appended claims. The present invention is not limited to the embodiments described heretofore. For example, the size, shape, location or orientation of the various components can be changed as needed and/or desired.

Although in the previously explained embodiment the second securing end portion, 24b of the first cleat securing member 24 and the second restricting end portion 6b of the cleat movement restricting member 6 are joined by an intermediate section 24d, the present invention is not limited to such a configuration.

Figure 12:
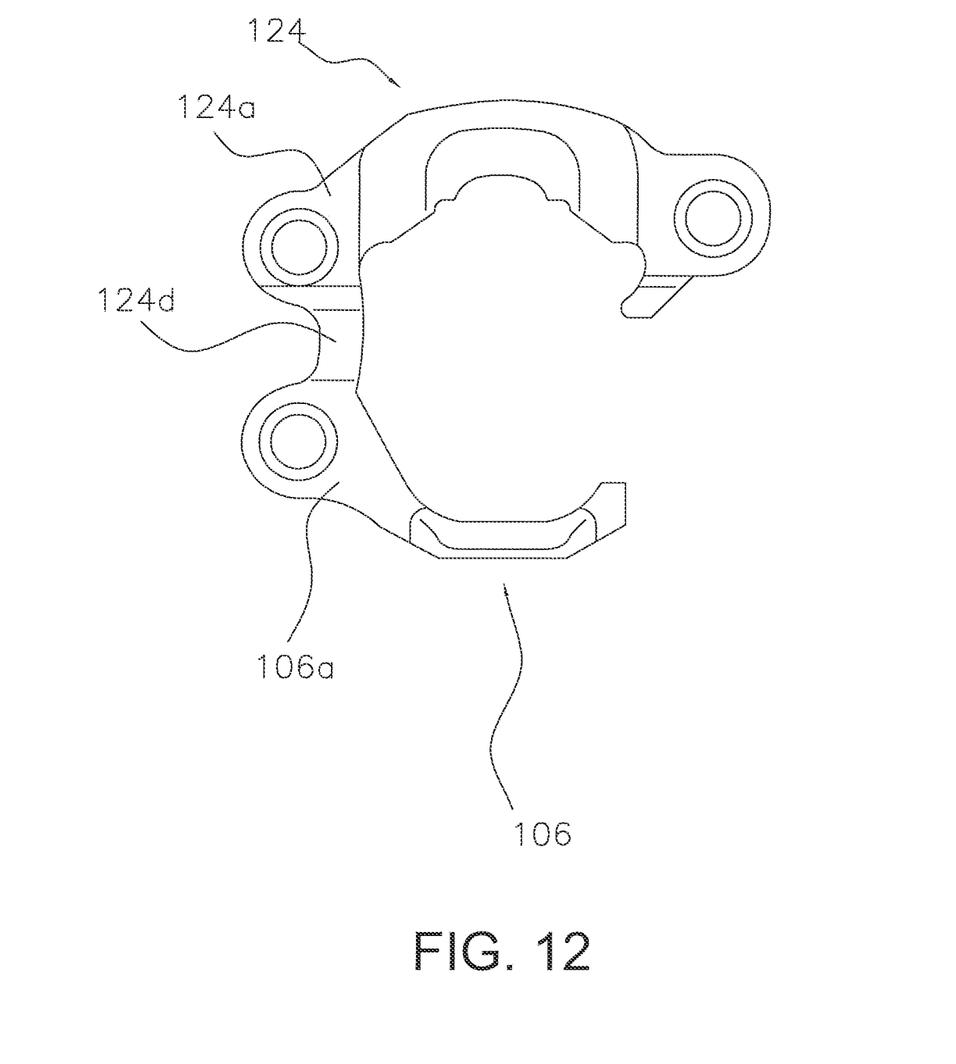
FIG. 12 is a top plan view, similar to FIG. 5, of a cleat movement restricting member for the bicycle pedal illustrated in FIGS. 1 to 3 in accordance with another embodiment.

FIG. 12 shows an example in which a first securing end portion 124a of a first cleat securing member 124 positioned on a side of the first cleat securing member 124 located toward a base end side of a pedal axle is joined to a first restricting end portion 106 of a cleat movement restricting member 106 positioned on a side of the cleat movement restricting member 106 located toward the base end of the pedal axle 3 by an intermediate portion 124d.

Although in the previously explained embodiment the first cleat securing member 24 and the cleat movement restricting member 6 are formed as a one-piece integral unit, the present invention is not limited to such a configuration.

Figure 13:
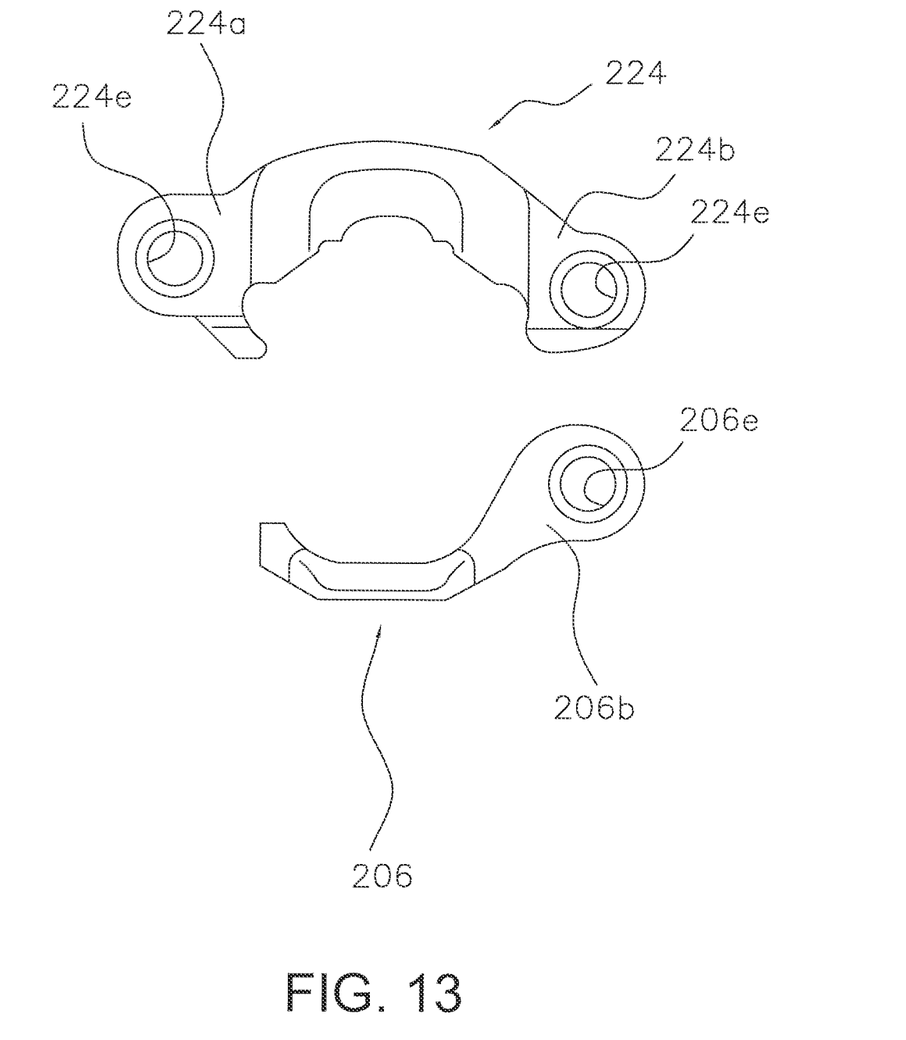
FIG. 13 is a top plan view, similar to FIG. 5, of a cleat movement restricting member for the bicycle pedal illustrated in FIGS. 1 to 3 in accordance with still another embodiment.

FIG. 13 shows an example in which a first cleat securing member 224 and a cleat movement restricting member 206 are provided separately. The first cleat securing member 224 is fastened to a main pedal body in two places with flat head screws inserted through a screw insertion hole 224e formed in a first securing end portion 224a and a screw insertion hole 224e formed in a second securing end portion 224b, A cleat movement restricting member 206 is fastened to the main pedal body with a flat head screw inserted through a screw insertion hole 206e formed in a second restricting end portion 206b.

Although in the previously explained embodiment the intermediate section 24d is arranged to avoid a center of the main pedal body 4 and suppress clogging due to mud and other debris, the present invention is not limited to such a configuration. It is acceptable to arrange an intermediate section in a center of the main pedal body.

The bicycle pedal is not limited to the shape of the coupling mechanism 5 presented in the previously explained embodiment. The present invention can be applied to other types of cleats.

Although the previously explained embodiment is configured such that the cleat movement restricting member restricts movement of the cleat in a rearward direction, it is also acceptable to configure the cleat movement restricting member to restrict movement in a frontward direction.

The present invention can also be applied to a shoe having a cleat that protrudes from the sole of the shoe, such as a road cycling shoe.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle pedal. Accordingly, these terms, as utilized to describe the bicycle pedal should be interpreted relative to a bicycle equipped with the bicycle pedal as used in the normal riding position on level ground with the bicycle pedal horizontally arranged. Finally, terms of degree such as "substantially", "about" and "approximately" as used herein mean a reasonable amount of deviation of the modified term such that the end result is not significantly changed.

Thus, the foregoing descriptions of the embodiments according to the present invention are provided for illustration only, and not for the purpose of limiting the invention as defined by the appended claims and their equivalents.

What is claimed is:

1. A bicycle pedal comprising:
a pedal axle;
a main pedal body rotatably supported on the pedal axle;
a coupling mechanism including a first cleat securing member configured to be coupled to a front portion of a cleat and a second cleat securing member that is rotatably attached to the main pedal body about a pivot axis and is configured to be coupled to a rear portion of the cleat, the second cleat securing member including a cleat contacting surface;
a force exerting member operatively disposed between the main pedal body and the second cleat securing member, the force exerting member being configured to bias the second cleat securing member in a cleat securing direction to contact the rear portion of the cleat; and
a cleat movement restricting member disposed underneath an end of the second cleat securing member as viewed from an axial direction that is parallel to the pivot axis, the end including the cleat contacting surface that is configured to contact the cleat while the cleat is engaged with the second cleat securing member, the cleat movement restricting member being configured to restrict movement of the cleat in a rearward direction, the cleat movement restricting member being further configured and arranged relative to the coupling mechanism such that the cleat movement restricting member guides the cleat in an upward direction such that the cleat detaches from the coupling mechanism during a cleat disengagement operation in which the cleat detaches from the coupling mechanism,
the cleat movement restricting member having a first slanted surface that is configured to guide the cleat upward such that the cleat detaches from the coupling mechanism.

2. The bicycle pedal according to claim 1, wherein
the cleat movement restricting member is arranged in a position relative to the main pedal body such that the cleat movement restricting member restricts rearward movement of the cleat while retained by the coupling mechanism to the main pedal body.

3. The bicycle pedal according to claim 2, wherein
the cleat movement restricting member is arranged rearward of the first cleat securing member so as to face toward the first cleat securing member.

4. The bicycle pedal according to claim 3, wherein
the cleat movement restricting member is located farther rearward with respect to the main pedal body than the pedal axle.

5. The bicycle pedal according to claim 2, wherein
the first cleat securing, member is non-movably fastened to the main pedal body.

6. The bicycle pedal according to claim 5, wherein
the cleat movement restricting member is joined integrally to the first cleat securing member through an intermediate portion as a one-piece, unitary member.

7. The bicycle pedal according to claim 6, wherein
the cleat movement restricting member has a second slanted face that is positioned on an opposite side as the first slanted face and that is slanted in a same direction as the first slanted face.

8. The bicycle pedal according to claim 1, wherein
the first cleat securing member is non-movably fastened to the main pedal body.

9. The bicycle pedal according to claim 1, wherein
the cleat movement restricting member is joined integrally to the first cleat securing member through an intermediate portion as a one-piece, unitary member.

10. The bicycle pedal according to claim 9, wherein
the first cleat securing member has a first securing end portion that is positioned adjacent a base end of the pedal axle, and a second securing end portion that is positioned adjacent a tip end of the pedal axle;
the cleat movement restricting member has a first restricting end portion that is positioned adjacent the base end of the pedal axle, and a second restricting end portion that is positioned adjacent the tip end of the pedal axle; and
the intermediate portion joins the second securing end portion and the second restricting end portion together.

11. The bicycle pedal according to claim 9, wherein
the first cleat securing member has a first securing end portion that is positioned adjacent a base end of the pedal axle and a second securing end portion that is positioned adjacent a tip end of the pedal axle;
the cleat movement restricting member has a first restricting end portion that is positioned adjacent the base end of the pedal axle and a second restricting end portion that is positioned adjacent the tip end of the pedal axle; and
the intermediate portion joins the first securing end portion and the first restricting end portion together.

12. The bicycle pedal according to claim 1, wherein
the cleat movement restricting member is a separate and distinct member from the first cleat securing member.

13. The bicycle pedal according to claim 1, wherein
the cleat movement restricting member has a second slanted face that is positioned on an opposite side as the first slanted face and that is slanted in a same direction as the first slanted face.

14. The bicycle pedal according to claim 1, wherein
the first cleat securing, member, the second cleat securing member, and the cleat movement restricting member are provided on a first face of the main pedal body, and
an additional first cleat securing member, an additional second cleat securing member, and an additional cleat movement restricting member are provided on a second face of the main pedal body that is opposite the first face.

15. A bicycle pedal comprising:
a pedal axle;
a main pedal body rotatably supported on the pedal axle;
a coupling mechanism including a first cleat securing member non-rotatably attached to the main pedal body and a second cleat securing member configured to be coupled to a rear portion of a cleat; and
a cleat movement restricting member configured to restrict movement of the cleat in a rearward direction, the cleat movement restricting member having a first slanted surface that is configured to guide the cleat in an upward direction such that the rear portion of the cleat pushes against the second cleat securing member to detach the cleat from the coupling mechanism.

* * * * *